United States Patent [19]

Marek

[11] 4,128,960
[45] Dec. 12, 1978

[54] WEIGHT ARRESTOR

[76] Inventor: Larry L. Marek, 444 Benson, NE., Grand Rapids, Mich. 49503

[21] Appl. No.: 679,658

[22] Filed: Apr. 23, 1976

[51] Int. Cl.$^2$ .............................................. A01K 87/04
[52] U.S. Cl. ..................... 43/27.4; 43/43.13; 43/44.91; 43/17.2; 114/205; 254/190 R
[58] Field of Search ................... 43/27.4, 43.12, 43.13, 43/44.9, 44.91, 17.2; 114/0.5 A, 204, 205; 254/169, 198, 149, 137, 138, 190 R; 242/106

[56] References Cited

U.S. PATENT DOCUMENTS

| 520,052 | 5/1894 | Hirschmann | 43/17.2 |
| 1,521,404 | 12/1924 | Smith | 214/15 C |
| 2,608,785 | 9/1952 | Hall | 43/17.2 |
| 3,172,225 | 3/1965 | Zoss | 43/17.2 |
| 3,874,110 | 4/1975 | Larson | 43/43.12 |

FOREIGN PATENT DOCUMENTS

502789 5/1954 Canada ...................................... 43/17.2

OTHER PUBLICATIONS

Copy of Commercial Model of a Weight Arrestor, filed by Attorney of Record.

*Primary Examiner*—William Piepaz
*Attorney, Agent, or Firm*—McGarry & Waters

[57] ABSTRACT

A weight arrestor for attachment to downriggers; the weight arrestor has an elongated coiled spring surrounding a downrigger cable. The spring radially flexes under stress exerted by the cable and slides up and down on the cable. The spring is adjustably coupled to a fastener. A cord is desirably fastened to both the spring and fastener. The fastener automatically secures the cord when tension is on the cord. The fastener is pivotally mounted onto a downrigger.

9 Claims, 9 Drawing Figures

WEIGHT ARRESTOR

BACKGROUND OF THE INVENTION

1. Field of the Invention

This invention relates to a downrigger weight arrestor for lifting weights and maintaining the weights in an elevated position.

2. Description of Prior Art

Downriggers are used for deep water fishing. Downriggers are usually attached securely on a side of a boat. Downriggers have a reel to which a length of cable is wrapped around, and a rod extending outwardly over the water. A pulley is positioned at the outer end of the rod. The cable is trained around the pulley and is weighted downward to where a weight is attached to the cable. The reel may be unwound to let the weight on the cable descend to desired depths in the water. A fishing line is removably attached to the weight so the fish hook can accompany the weight and descend to certain depths to where certain fish are most likely to be caught.

A problem is encountered in downriggers with the ease to which the operator may grasp or secure the weight in a fixed position. The cable, when wound in, will have the weight dangling from its end. The weight when dangling on a downrigger attached to a moving boat is a safety hazard in that it is capable of swinging and hitting somebody plus capable of damaging the boat and downrigger. The downrigger rod is substantially longer than the human arm so it is not feasible for the operator to reach over and grab the weight plus the fact that the operator must reach over the side of the boat to grasp the cable or weight presents a danger which should be avoided.

Various means have been devised to elevate the weight, draw it within reach of the operator, and to secure it in a relatively fixed position. To circumvent this problem of the dangling weight, downriggers have been manufactured with pivotal bases wherein the downrigger may be pivoted so the downrigger arm has its end within reach of the operator. The operator then manually grabs the weight or the downrigger cable and brings in the weight.

Another apparatus heretofore employed has been a hook attached to an elongated shaft wherein the operator may reach overboard, hook and draw in the cable and manually grab and secure the weight.

Another apparatus employed to lift the weight is a pull ring placed around the cable. Attached to the pull ring is a cord connected at its other end to the boat or downrigger. In the midsection of the cord a handle is attached. An operator may reach over and grab the handle and pull it upwards. Then, the handle may be hooked onto a stationary hook to maintain the weight in a secured elevated position.

SUMMARY OF THE INVENTION

The invention is a weight arrestor for a downrigger in which the weight arrestor has a means to guide a downrigger cable up and toward the operator. The guide means, when engaged with the cable, arcs a portion of the cable into smooth, curved configuration. A flexible arc producing means is attached to the guide means and flexes under stress from the cable for producing an arc in the cable of radius significantly larger than the diameter of the cable. Preferably, the weight arrestor has an elongated flexible tubular element in which the downrigger cable is positioned therethrough. The tubular element slides along the downrigger cable. When under stress from the cable, the tubular element will radially flex and the cable will be gently curved through the curved tubular element. The tubular element is adjustably coupled to a fastener which is mounted on the downrigger or boat. Preferably, the tubular element is coupled to the fastener by a cord. In a specific embodiment, the fastener adjustably fixes the cord running therethrough.

Preferably, the tubular element is an elongated coiled spring. Around the exterior midsection of the spring there is a metal band having a side tab extending outwardly. The side tab has an aperture therethrough. The cord is operably attached to the side tab through the aperture. The cord runs through the fastener which is mounted on the downrigger and boat at a convenient position for the operator. The fastener has a lock position and a release position. Preferably the means automatically move the fastener to the lock position.

In a specific embodiment, the fastener has two arms pivotally connected to each other. One arm has a channel facing the other arm. The channel is of sufficient size to have the cord lie therein. The other arm has a pressure tab at one end which engages the cord in a fixed position. Pivoting of the second arm lifts the pressure tab and disengages it from the cord allowing the cord to run freely within the channel.

At the other end of the second arm, a hook is pivotally attached. The hook is pivotally mounted onto the downrigger.

Preferably, the arm with the channel has a channel section curved away from the second arm at the end opposite the end which is adjacent the pressure tab of the second arm. The cord within the curved channel subtends a substantial angle when the fastener is in a lock position.

Force is exerted on the cord by the weighted cable pulling on the flexible spring tube which is connected to the cord. This force causes the curved portion to pivot away from the second arm. This results in the pressure tab pivoting toward the channeled arm and engaging the cord and fixing it thereto. The fastener easily disengages from the cord by pressure exerted on the curved portion of the first arm toward the second arm.

The cord is of sufficient length to always lie within the fastener channel whether the weight is within the water or out of the water.

DETAILED DESCRIPTION OF THE PREFERRED EMBODIMENTS

Figure 1:
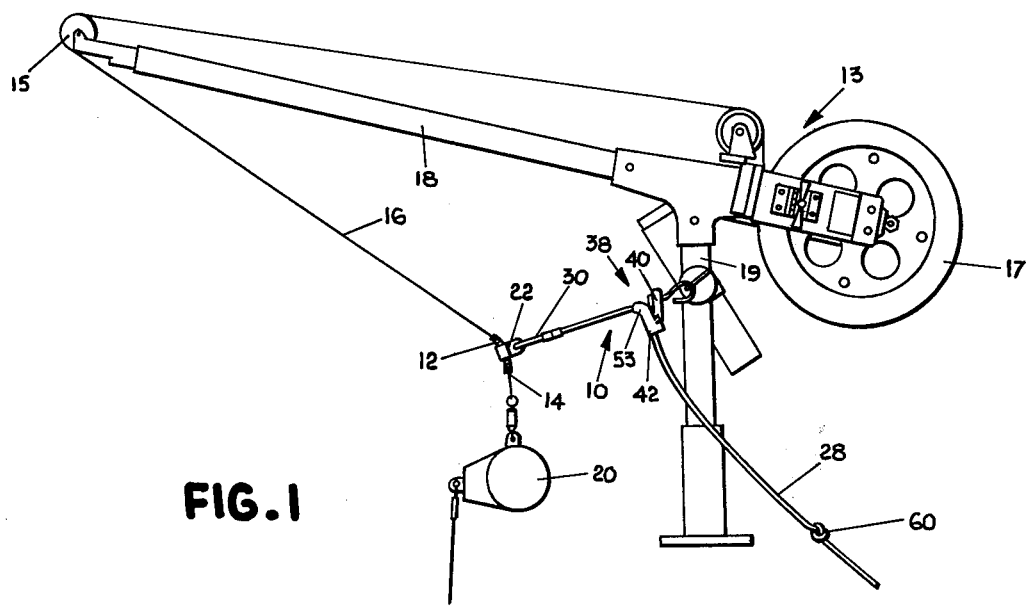
FIG. 1 is a side elevational view of a weight arrestor according to the invention in the arrested position.
Figure 2:
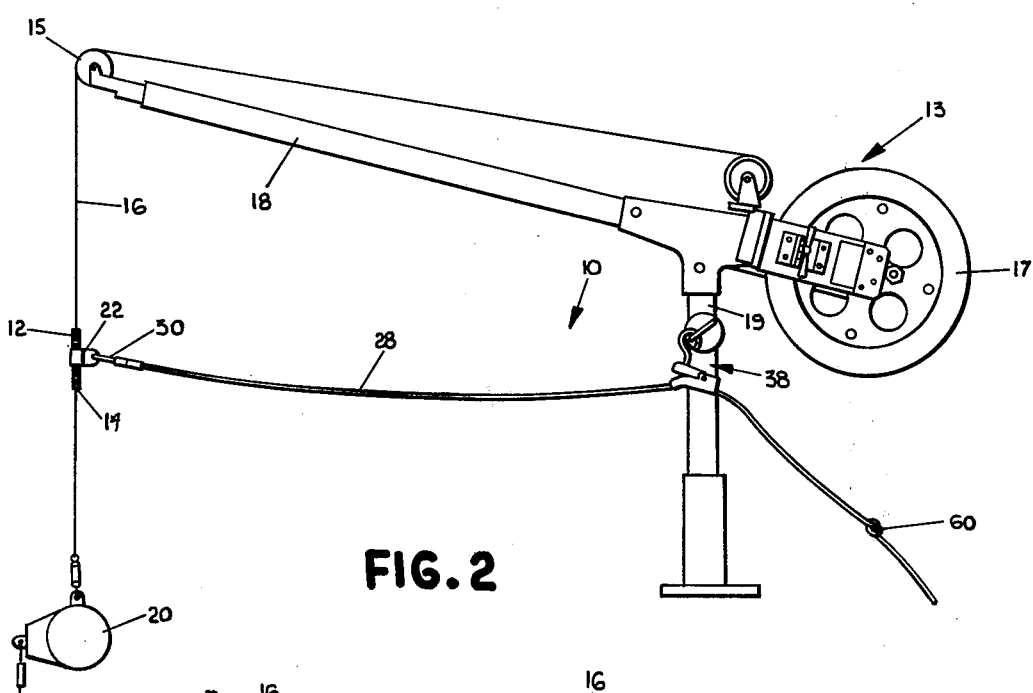
FIG. 2 is a side elevational view of the weight arrestor shown in FIG. 1 in the non-arrested position.

Referring to FIGS. 1 and 2, the weight arrestor 10 is operably connected to a downrigger 13. The downrigger is fixedly secured to a side rail of a boat (not shown). The downrigger 13 has a cable 16 trained around a pulley 15 which is positioned at the outer end of outwardly extended rod 18 which extends over the water (not shown). The cable 16 is wound around reel 17. Reel 17 may be rotated to wind or unwind cable 16. A weight 20 is attached to cable 16 at the free end of cable 16.

The weight arrestor 10 has an elongated coil spring 12 at one end and a fastener 38 at another end coupled together by a cord 28.

The elongated spring 12 has an aperture 14 therethrough. A cable 16 from a downrigger 18 is positioned through the aperture 14 with a weight 20 attached to the end of the cable 16 and below the spring 12. The fastener 38 is pivotally mounted onto stem 19 of the downrigger 18.

Figure 3:
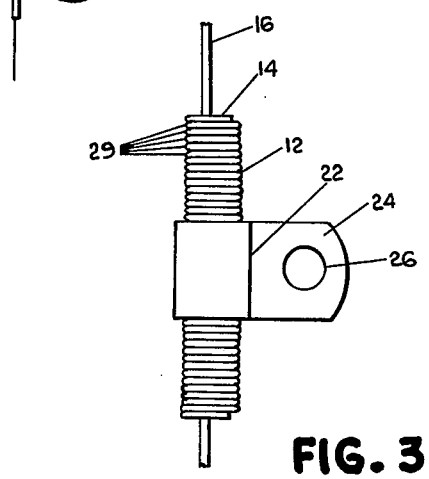
FIG. 3 is a enlarged view of the element engaging the downrigger cable as viewed in FIG. 2.
Figure 4:
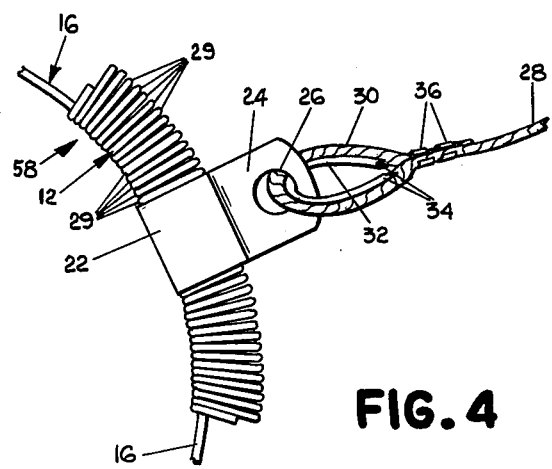
FIG. 4 is a enlarged view of the element engaging the downrigger cable as viewed in FIG. 1.
Figure 9:
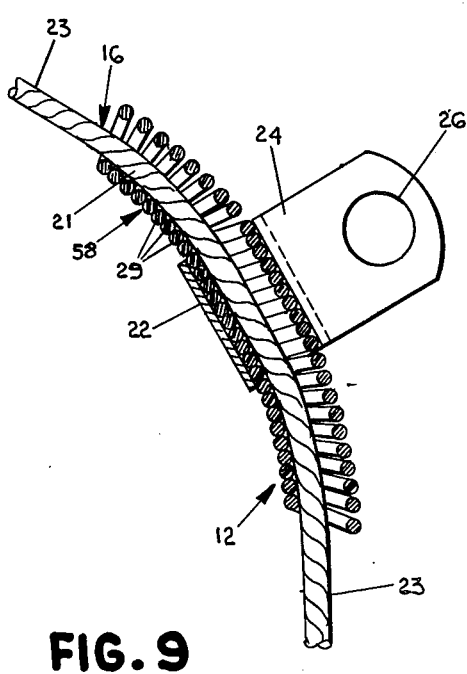
FIG. 9 is a cross-sectional view of the invention engaging the cable shown in FIG. 4.

Referring to FIGS. 3 and 4, the coil spring 12 has its coils 29 contiguous to each adjacent coil. The spring 12 has 20 coils per inch of spring. Each coil has a ¼ inch diameter. The spring is 1μ inches long. The multitude of coils in the spring 12 allows it to flex radially when under stress. As shown in FIG. 9, side 58 radially flexes and the cable 16 conform into a curvilinear configuration 21 having a relatively large radius compared to the diameter of the cable. The straight sections 23 of cable 16 connect to the curved section 21 of cable 16 at the ends of spring 12. The axis of straight sections 21 are tangential to the curve which the axis of curved section 21 defines. The spring is made from stainless steel so as to retard rust and maintain the flexibility of the spring for a long interval of time. The spring has attached to it at its exterior midsection a metal band 22 which is tightly clamped around the spring 12. A side tab 24 extends outwardly from the metal band 22. The side tab 24 has an aperture 26 therethrough.

Figure 5:
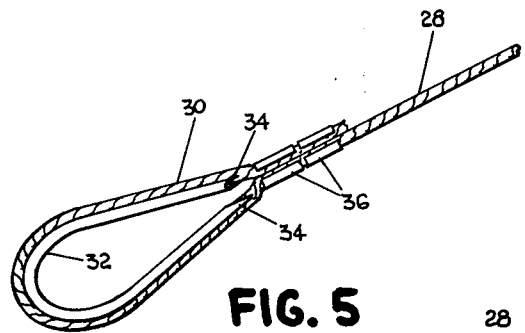
FIG. 5 is a partial enlarged view of the cord as viewed in FIG. 4.

A nylon cord 28 has a looped end 30 which passes through aperture 26. Referring to FIG. 5, the looped end 30 has a metal reinforcement 32 crimped around the inside perimeter of the looped end 30. The reinforcement 32 has slotted ends 34 through which the nylon cord 28 is crimped, thus maintaining the metal reinforcement 32 securely onto the looped end 30. Clamps 36 securely bind the nylon cord 28 onto itself to form the looped end 30.

Figure 6:
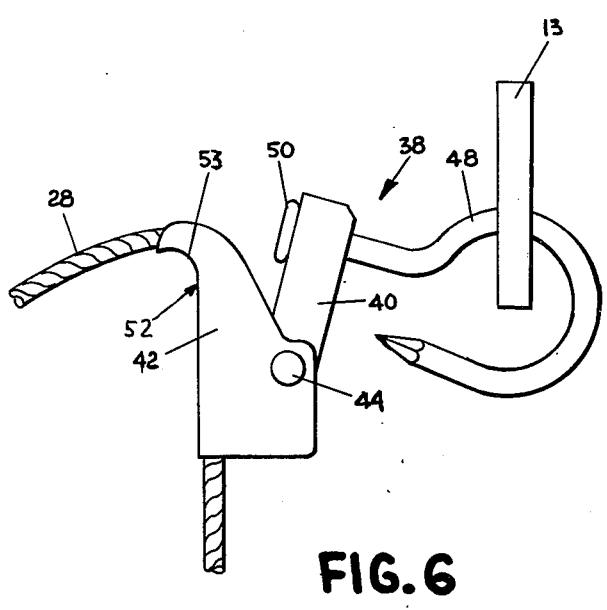
FIG. 6 is an enlarged view of the fastening mechanism in the locked position as viewed in FIG. 1.
Figure 7:
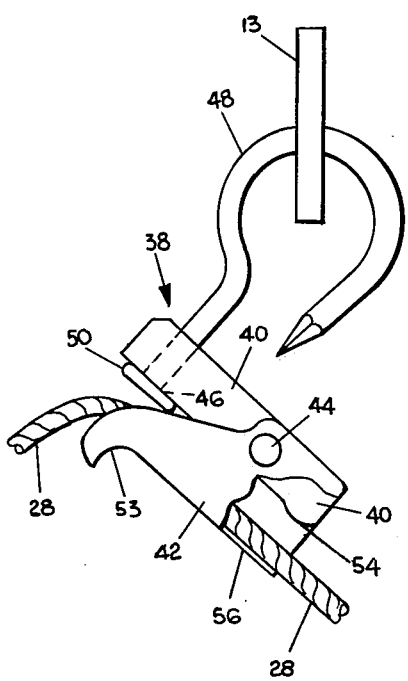
FIG. 7 is a partially broken and enlarged view of the fastening mechanism when in the released position as viewed in FIG. 2.

The cord runs to the fastener 38, as shown in FIGS. 6 and 7. The fastener 38 has two arms 40 and 42 pivotally connected to each other by a pin 44. An aperture 46 passes through the upper end of arm 40. A hook 48 passes through aperture 46. The hook has a head 50 which prevents the hook from passing completely through aperture 46. The hook is pivotally mounted on downrigger 18.

Figure 8:
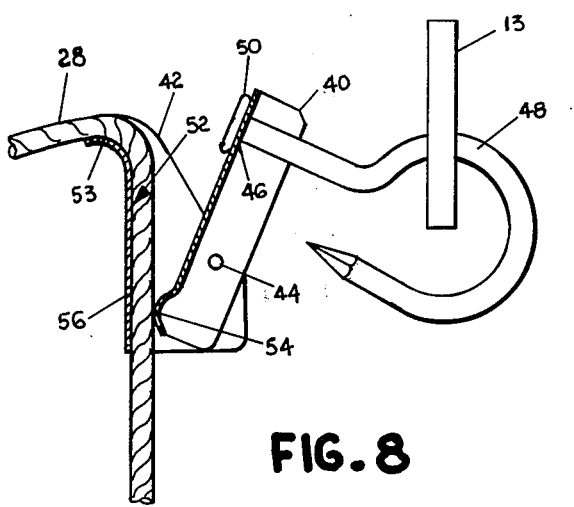
FIG. 8 is a cross-sectional view of the fastening mechanism shown in FIG. 6.

As shown in FIG. 8, arm 42 has a channel 52 in which cord 28 may be positioned. Channel 52 has a portion 53 substantially curved away from arm 40. Arm 40 has a tab 54 at an end opposite aperture 46. Tab 54 engages nylon cord 28 and secures it against a straight part 56 of channel 52. As shown in FIG. 7, tab 54 disengages cord 28 when arms 40 and 42 pivoted so that the aperture end of arm 40 is near arm 42. A knot 60 is placed at the loose end of cord 28. The knot 60 is larger than channel 52 which prevents the cord 28 from becoming disengaged with fastener 38.

Referring to FIG. 2, the downrigger 13 has its cable 16 trained around pulley 15 and extending vertically downward to where weight 20 is attached. Reel 17 is unwound to allow weight 20 to descend a desired depth in the water. A fish line may be attached to the weight before decent of the weight and the operator may deepwater fish or go trolling in the boat.

Fastener 38 is in a released position and spring 12 is straight and free to slide along cable 16. Knot 60 prevents the cord 28 from disengaging from fastener 38 and keeps the cord 28 within easy reach for the operator.

When fishing is no longer desired, the reel 17 is wound and cable 16 is wound up and lifts weight 20 out of the water. The weight is now in a dangling position. To bring in and secure weight 20, cord 28 is pulled and the pulling on the cord 28 draws in spring 12 and consequently cable 16. As cable 16 is pulled away from its vertical position it will be under tension to return to it. The stress is exerted on spring 12 which flexes. The flexing forces the cable 16 to be shaped in a curvilinear configuration having a large radius instead of a natural tight curve which can distort or permanently bend cable 16. Referring to FIG. 9, the cable 16 is in contact with the inner radially curved side 58 of spring 12.

As shown in FIG. 1, after the cord 28 is pulled, the weight is in a secure and close position to the operator. Fastener 38 will automatically lock when cord 28 is released. The cord which is under tension from the spring 12 and curved cable and will be pulled away from fastener 38. The cord pulls curved channel section 53 of arm 42 away from the aperture end of arm 40. The movement of these ends of arms 40 and 42 causes tab 54 to engage cord 28 at the straight channel section 56 from 42.

The weight 20 can be secured in the arrested position for an indefinite amount of time. When the weight is desired to be released, the operator presses aperture of arm 40 and the curved channel section of arm 42 toward each other. The inward motion will disengage tab 54 from cord 28. The weight 20 is free to swing away from downrigger 13 and obtain a position as disclosed in FIG. 2. The weight 20 can be lowered into the water by unwinding of cable 16 from reel 17.

The invention provides an efficient and economical way to elevate the weight of a downrigger and to minimize any harmful stresses encountered by the cable in the elevation of the weight. A simple pull on cord 28 will elevate weight 20 and bring it toward the downrigger 18 in a elevated position. A simple squeeze or fastener 38 will release the weight from the elevated position. The spring 12, as it slides along weighted cable 16, radially flexes under any stress exerted by the weighted cable 16. The radial flexing of the spring 12 minimizes the harmful stress placed upon a single point on the cable. As a result the cable does not become distorted, curled or frayed upon the multitude of times the spring 12 will slide along cable 16 during the operation of the invention.

It should be understood that the foregoing embodiment of the invention is merely illustrative of the preferred practice of the invention and various changes and modifications may be made in the arrangements and details of construction of the embodiment described without departing from the spirit and scope of the invention.

The embodiments of the invention in which an exclusive property or privilege is claimed are defined as follows:

1. A cable arrestor for drawing a downrigger cable in to the back of a boat from a position rearward of the back of the boat, comprising:

a flexible tubular cable guide surrounding the cable, the cable being easily slidable through the cable guide, the cable guide being fabricated such that the cable guide resiliently defects into a smooth arc and prevents sharp bends in the cable when the cable guide is pulled in to the back of a boat, the radius of said smooth arc being significantly larger than the diameter of the cable; and tether line means attached to the cable guide and adapted to extend from the cable guide to the boat for drawing the cable guide and cable in to the back of the boat; and releasable fastening means for securing the tether line to the boat.

2. Apparatus as defined in claim 1 wherein the flexible tubular cable guide comprises a spring having contiguous coils in the unflexed position, the spring being of sufficient length and having a sufficient number of coils to allow the spring to radially flex such that the coils maintain a contiguous position on the inner radially flexed side of the spring and the cable lies adjacent and conforms to the curvilinear flexed position of the inner radially flexed side.

3. A cable arrestor according to claim 1 wherein the tubular cable guide is a section of a coil spring.

4. A cable arrestor according to claim 3 wherein the tether means is attached to the cable guide by means of a band that encircles the cable guide, the band having an outwardly extending tab with fastening means thereon for attaching the tether means to the tab.

5. A cable arrestor according to claim 4 wherein the tab fastening means comprises an aperture in the tab and the tether means includes a looped end that is fitted through the aperture, the looped end having a reinforcement along the inner edge thereof which contacts the edge of the aperture.

6. A cable arrestor according to claim 1 wherein the fastener means includes releasable clamp means for clamping the tether means at any point along the tether means so as to hold the cable at any desired position relative to the rear of the boat, the clamp means being releasable to relieve the clamping restraint on the tether means and permit the downrigger cable to assume its normal position, unaffected by the cable arrestor.

7. A cable arrestor according to claim 6 wherein the fastener means comprises an elongated clamping member pivotably mounted between opposing sides of an elongated channel member, the tether means extending between the clamping member and the back of the channel member, the clamping member being pivotably mounted at a point between its ends, with a pressure tab being formed at an end away from the direction of the cable guide, the other end of the clamping member including attachment means for attaching the fastener means to the boat or base of the downrigger, the fastener means being constructed and suspended from the boat such that when the downrigger cable is drawn in to the boat, tension in the tether means produces a pressure against the back of the channel member that causes the channel member to pivot relative to the clamping member such that the clamping surface is pressed against the tether means, the clamping surface permitting the tether means to be drawn in toward the boat but preventing the tether means from slipping out through the fastening means until the clamping member is manually released.

8. A weight arrestor for supporting and securing a weight attached to a cable of a downrigger wherein the downrigger is secured to a boat and comprises a rod extending outwardly from the edge of the boat over the water and a weighted cable extending downwardly from the outer end of the rod, said weight arrestor comprising:

guide means for drawing in the hanging portion of the cable toward a side of the boat, the guide means including:

arc producing means slidably engaging the cable for laterally restraining the cable, the arc producing means curving the downrigger cable into an arc of radius significantly larger than the diameter of the cable when the cable is drawn in toward the boat; and cord means operably connected to the arc producing means for drawing the arc producing means and cable in to the boat;

releasable fastening means for releasably securing the cord means to the boat at any desired position along the length of the cord, the fastening means having two arms pivotally interconnected, one arm having an inner channel to enable the cord to slide therein, the other arm having an engaging tab on one end thereto that is pivotable to a lock position wherein the tab engages the cord at one end of the channel and secures it from sliding;

the inner channel being curved away from the second arm at an end opposite the end which is engaged by the tab;

the cord within the curved inner channel subtending a substantial angle when the fastener is in a lock position; and pressure exerted by the cord onto the curved section of the channel automatically pivoting the fastener arms so the tab on the second arm engages the cord and secures the cord in a fixed position.

9. An apparatus as defined in claim 8 wherein:

the second arm has an aperture through an end opposite the end of the tab; and a hook having an engaging head is positioned through the aperture with the head engaging the second arm; and the hook is pivotally mounted on the downrigger.

* * * * *